United States Patent
Wobben

(10) Patent No.: US 7,189,325 B2
(45) Date of Patent: Mar. 13, 2007

(54) METHOD AND DEVICE FOR DESALTING WATER

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 311 days.

(21) Appl. No.: 10/432,498

(22) PCT Filed: Jul. 18, 2001

(86) PCT No.: PCT/EP01/08271

§ 371 (c)(1),
(2), (4) Date: Oct. 2, 2003

(87) PCT Pub. No.: WO02/41979

PCT Pub. Date: May 30, 2002

(65) Prior Publication Data

US 2004/0089603 A1    May 13, 2004

(30) Foreign Application Priority Data

Nov. 21, 2000  (DE) ................. 100 57 613

(51) Int. Cl.
*B01D 61/06* (2006.01)
(52) U.S. Cl. .............. 210/637; 210/134; 210/137; 210/257.2; 210/258; 210/652; 210/321.66; 417/400
(58) Field of Classification Search .......... 210/134, 210/137, 258, 321.65, 321.66, 652, 416.1, 210/416.3, 257.2, 637; 417/390, 401, 403, 417/404, 53, 399, 400
See application file for complete search history.

(56) References Cited

U.S. PATENT DOCUMENTS

| | | | |
|---|---|---|---|
| 4,124,488 A * | 11/1978 | Wilson | 210/134 |
| 4,178,240 A | 12/1979 | Pinkerton | |
| 4,367,140 A | 1/1983 | Wilson | 210/110 |
| 4,434,056 A * | 2/1984 | Keefer | 210/637 |
| 5,154,820 A * | 10/1992 | Solomon | 210/134 |
| 5,797,429 A | 8/1998 | Shumway | 137/625.69 |
| 6,017,200 A | 1/2000 | Childs et al. | 417/404 |

FOREIGN PATENT DOCUMENTS

DE    29 24 971    1/1981

* cited by examiner

*Primary Examiner*—Joseph Drodge
(74) *Attorney, Agent, or Firm*—Seed IP Law Group PLLC

(57) ABSTRACT

The invention pertains to a method and a device for desalting water by reverse osmosis, particularly for desalting seawater, in which saltwater is introduced under a first pressure into a pressure-compensation device and conducted from pressure-compensation device at a second, higher pressure into a membrane module, wherein desalted water and concentrated saltwater are conducted out of membrane module, wherein the concentrated saltwater conducted out of membrane module is continuously introduced at roughly second pressure into pressure-compensation device and used there to apply roughly second pressure to saltwater introduced into pressure-compensation device and to introduce saltwater into membrane module, and wherein the introduction of concentrated saltwater into pressure-compensation device and the conduction of concentrated saltwater out of pressure-compensation device are accomplished by means of controlled main valves. The main valves are subject to high mechanical stresses, particularly during the opening and closing of the valves. To reduce or avoid these, it is provided according to the invention that secondary valves arranged in parallel with main valves are controlled such that load peaks during opening and/or closing of main valves are reduced.

13 Claims, 4 Drawing Sheets

METHOD AND DEVICE FOR DESALTING WATER

FIELD OF THE INVENTION

The invention pertains to a method for desalting water by reverse osmosis according to the preamble of claim 1, as well as to a device for carrying out this method.

BACKGROUND OF THE INVENTION

Such a method and such a device are described in German Patent Application No. 199 33 147.2. Therein, the saltwater is introduced under a first pressure into a pressure-compensation device and introduced from the pressure-compensation device, under a second, higher pressure, into a membrane module, desalted water and concentrated saltwater being removed from the membrane module. Desalted water is to be understood here as water with a salt content reduced in relation to the saltwater introduced into the device. To increase the efficiency and thus the energy balance for such a method and such a device, it is proposed there that the concentrated saltwater removed from the membrane module be introduced continuously under the second pressure into the pressure-compensation device, and be used there to apply the second pressure to the saltwater introduced into the pressure-compensation device and to introduce the saltwater out of the membrane module. Introduction of the concentrated saltwater into the pressure-compensation device is accomplished with check valves, and draining of the concentrated saltwater out of the pressure compensation device is accomplished here by means of controlled main valves. These controlled main valves are preferably actively controllable, and are arranged in the appropriate connecting lines between the membrane module and the pressure-compensation device or between the pressure-compensation device and the output for the concentrated saltwater.

A method as mentioned initially and a device as mentioned initially are known from EP 0 028 913. There, a pump is provided to compensate for pressure losses.

The recovery of energy from a highly pressurized fluid by means of a hydraulic motor driven by this fluid is known from DE 24 48 985. Cylinder/piston combinations operating in opposite phase are provided here, but they are connected mechanically by way of connecting rods to a crankshaft, which is in turn driven by a drive unit, to compensate for pressure losses. Several disadvantages are inherent to this system, however, such as a complicated bearing method and guidance of the pistons and connecting rods, since they are subjected to movements in two directions by the crankshaft. A device for desalting water by reverse osmosis, in which main valves and parallel secondary valves are provided for deriving concentrated saltwater from a membrane module and from exchange means, is known from FIG. 1 in U.S. Pat. No. 5,797,429.

A device for desalting water by reverse osmosis with two piston/cylinder devices operating in opposite phase is known from U.S. Pat. No. 6,017,200.

In known methods and devices, a high pressure is applied to the main valves. If the main valves, are operated, then a high mechanical stress results precisely at the moment of initial opening or at the last moment of closing such a main valve. However, since these main valves are designed for high flow rates, they must be correspondingly large and massive.

Since the main valves are relatively slow due to their size and mass, they are exposed to large pressure changes for a relatively long time, particularly at the beginning of the opening process and at the end of the closing process. Since such devices are intended to operate without interruption, if possible, these main valves are thus under a high long-term stress, due to the magnitude and duration of the stress on the one hand, and to the frequency of load alternations on the other.

BRIEF SUMMARY OF THE INVENTION

The invention is thus based on improving the initially mentioned method and device with regard to the aforesaid disadvantages, and configuring them such that the main valves undergo less wear.

The basis of the invention is the knowledge that load peaks occur especially during the opening and closing of the main valves, and the point is to avoid these. This is achieved by the secondary valves, also known as bypass valves, that are provided according to the invention, via which a part of the pressure occurring during opening and closing of the main valves is conducted around the main valves. For this purpose, appropriate secondary lines, in which the secondary valves are arranged, are provided around the main valves.

The secondary valves are preferably controlled such that they are opened shortly before the opening or closing of the main valves, and/or that they are opened only during the opening or closing process of the main valves. Otherwise, the secondary valves are normally closed.

In an advantageous configuration, the secondary valves have a narrower cross section than the main valves. The cross section of the secondary valves can even be markedly smaller than the cross section of the main valves, and the secondary valves can have a considerably higher pressure resistance. Thus the stress on the main valves can be markedly reduced by suitable control of the secondary valves, and thus their service life can be proportionally increased.

The cross section of the secondary valves can be chosen arbitrarily in an alternative configuration of the invention. A contribution to the fluid transport can also be supplied via the cross section of the secondary valves, as can be provided by the appropriate controllers. This means that the secondary valves are opened or closed at the same time as the corresponding main valves arranged in parallel with them, with the difference that the secondary valves are opened somewhat earlier than the parallel main valves, and closed somewhat later than the parallel main valves, to relieve the load on them.

A pressure reservoir that is connected to the output for conducting the concentrated saltwater out of the membrane module, and to the input of the pressure compensation device, is provided in a preferred embodiment of the invention. This pressure reservoir is therefore subjected to the same pressure as the concentrated saltwater itself. The purpose of this pressure reservoir is to compensate for the pressure fluctuations that unavoidably occur during valve actuations because of the losses of volume; thus an optimally constant operating pressure is assured in the membrane module.

In an additional advantageous configuration of the invention, flow limiters that prevent an abrupt equalization of pressure by limiting the maximum quantity passed are provided in the supply lines to the secondary valves, and thus contribute to a gradual pressure compensation and slow changes of pressure instead of abrupt fluctuations. These [flow limiters] can be differently dimensioned so as to create "flow resistances" of different magnitudes. The flow limiters can also be integrated into the secondary valves, since these have a narrow cross section in any event.

In a refinement of the invention, it is provided that the pressure compensation device comprises two piston/cylinder combinations operating in opposite phase, and that the pistons of the piston/cylinder devices are connected by a connecting rod. Such a connecting rod and its functioning is known from EP 0 028 913. Differently from this known connecting rod, however, no pump to compensate for pressure losses is provided in this refinement of the invention.

Instead, a drive unit for the connecting rod is provided in a secondary configuration of the invention to compensate for pressure losses. This drive unit can consist in the connecting rod's having, in a center section, teeth with which appropriately driven pinions engage. The desired operating pressure can thereby be maintained.

In the device according to the invention, a high-pressure pump creating a high pressure can be completely omitted, and can be replaced by a pump creating a considerably lower pressure if the pressure that the concentrated saltwater necessarily has at the output of the membrane module is exploited by continuous feedback of this concentrated saltwater into the pressure compensation device to apply pressure to the saltwater pumped into the pressure compensation device. The essential point is for this to take place continuously, since otherwise the pressure in the saltwater supply line from the pressure-compensation device to the membrane module would ease, and would have to be restored by a high-pressure pump. Continuous production of desalted water would not be possible, either.

Additional advantageous refinements of the method and device according to the invention can be deduced from the subordinate claims. It should be pointed out that the device according to the invention can be refined and have the corresponding configurations analogously to that described above and in the subordinate claims referring to claim 1, in conjunction with the method according to the invention.

BRIEF DESCRIPTION OF THE DRAWINGS

The invention will be described below on the basis of the drawings. They show in.

DETAILED DESCRIPTION OF THE INVENTION

Figure 1:
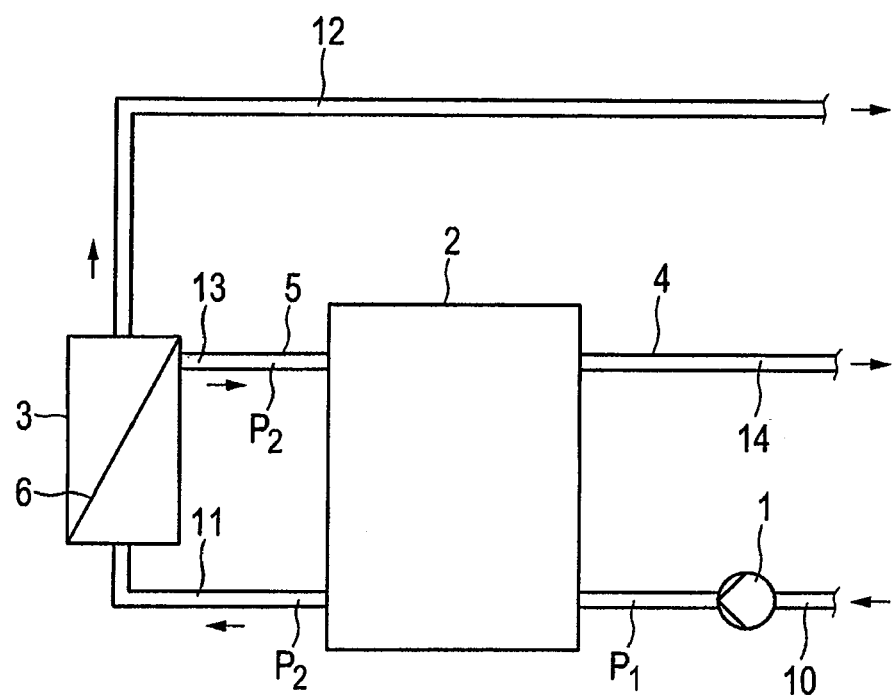
FIG. 1, a schematic circuit diagram to explain the method according to the invention.

The schematic diagram in FIG. 1 shows a supply pump 1 for introducing saltwater 10 into a pressure-compensation device 2 under a first pressure pi. The same saltwater 11, which is now, however, under a high working pressure, is fed from pressure-compensation device 2 to membrane module 3. There a part of the saltwater 11 (e.g., 25% of saltwater 11) passes through membrane 6, is desalted in the process and is drawn off as desalted water 12. The remainder of the saltwater 11 (75%, for instance) cannot pass through membrane 6 and is fed back by means of connecting line 5 to pressure-compensation device 2 as concentrated saltwater 13, which is still at nearly the high pressure p2. There, this high pressure is exploited, in a manner yet to be explained, to apply this high pressure to the saltwater 10 introduced into pressure-compensation device 2, and to feed it to membrane module 3 at the input of the latter. At the same time, this pressure is used in pressure-compensation device 2, in a manner also to be explained, to finally conduct the concentrated saltwater 14 present there away via drain line 4, and to feed unconcentrated saltwater 10 to pressure-compensation device 2. All the described processes take place simultaneously and continuously, so that a high pressure pump to supplement the high working pressure is not necessary, and a desalted water 12 is continually available.

Figure 2:
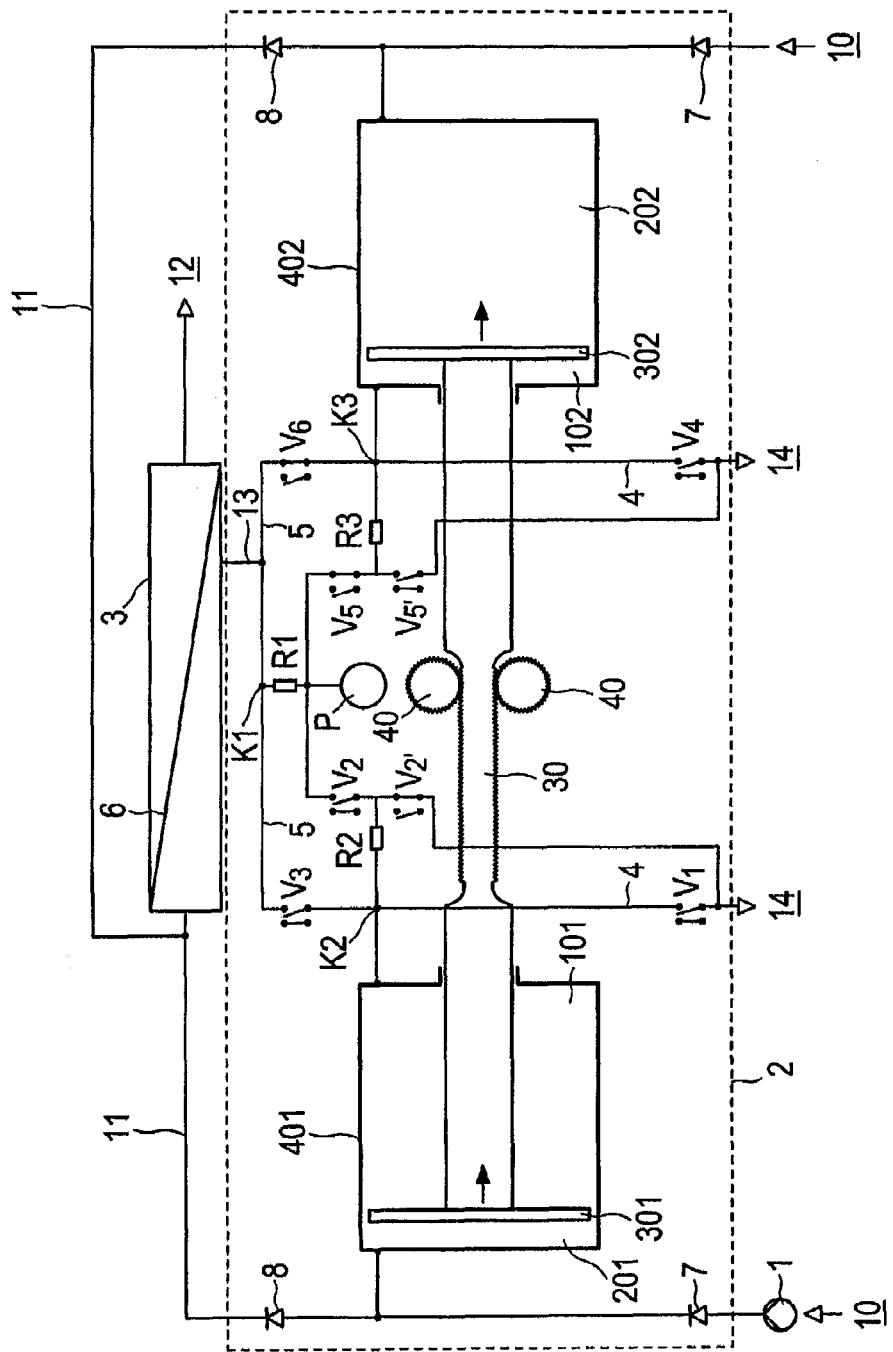
FIG. 2, an embodiment of the device according to the invention in a first operational state.

Based on the embodiment of the invention illustrated in FIG. 2, the configuration and functioning of pressure-compensation device 2 will in particular be explained further. Here, the latter comprises two identical piston/cylinder devices 401, 402, with two opposing aligned cylinders, each comprising an inlet chamber 201, 202 for accommodating saltwater 10 and an outlet chamber 101, 102 for accommodating concentrated saltwater 13. Inside piston/cylinder devices 401, 402 are respective special pistons 301, 302, which divide the piston interior into the aforesaid chambers and can be moved horizontally in the figure. Respective feed lines with (passive) check valves 7 lead from supply pump 1 to inlet chambers 201, 202. Check valves 7 are configured such that they open and allow a flow whenever the pressure in the feed line is greater than that in inlet chambers 201, 202. Comparable check valves 8, but having another flow direction, are found in the feed lines from inlet chambers 201, 202 to membrane module 3.

In the feed lines 5 from membrane module 3 to outlet chambers 101, 102 and in the drain lines 4 from outlet chambers 101, 102, on the other hand, actively switchable main valves V3, V6 and V1, V4, respectively, are arranged, by means of which the inflow of concentrated saltwater 13 from membrane module 3 to, or the outflow of concentrated saltwater 14 from, pressure-compensation device 2 can be controlled.

Pistons 301, 302 are permanently connected to one another by means of a connecting rod 30. Pinions 40, which can be driven, for instance, by geared electric motors and engage with a toothing cut on connecting rod 30, can drive connecting rod 30, and thus pistons 301, 302, in order to compensate for pressure losses.

The pistons are arranged such that they operate in opposite phase. If, then, a piston is in a position in which the volume of inlet chamber 202 is maximal and the volume of outlet chamber 102 is minimal, then the other piston, connected via connecting rod 30, is in a position in which the volume of inlet chamber 201 is minimal and the volume of outlet chamber 101 is maximal (compare to FIG. 2). In this situation, inlet chamber 202 is filled with water and outlet chamber 101 is filled with concentrated saltwater. Valves V1, V3, V4 and V6, represented here as switches, are controlled such that V3 and V4 are now closed, while VI and V6 are opened.

In this context, the opening of a valve signifies the creation of a flow connection to allow a through-flow, for which the valve is opened by purely mechanical means. Analogously, the closure of a valve signifies the interruption of a flow connection to interrupt a through-flow, for which the valve is closed by purely mechanical means.

By virtue of opening main valve V1, the pressure of the concentrated saltwater in outlet chamber 101 is first discharged. By opening main valve V6, outlet chamber 102 is subjected to pressure (e.g., 70 bar) and the concentrated saltwater flows into this chamber. Simultaneously, the saltwater present in inlet chamber 202 is pressed towards membrane module 3 by the pressure applied to the piston Since the pistons are arranged such that they operate in opposite phase, the introduction of the pressurized concentrate (at 70 bar, for instance) into outlet chamber 102 causes, via connecting rod 30, a movement of the other piston 301 which thereby empties unpressurized outlet chamber 101. At the same time, a negative pressure results in inlet chamber 201, which draws in saltwater and fills this chamber.

If outlet chamber 102 is filled, the main valves are appropriately controlled and the opposite process runs.

Since the membrane module is preferably operated at ca. 80 bar in order to realize a sufficiently high production of fresh water, and at most 10 bar pressure loss appears at the membrane, at least the aforesaid 70 bar pressure is available at concentrate drain 5 of membrane module 3 as the pressure of the concentrated saltwater.

To relieve the main valves from the large pressure changes, particularly while opening and closing, that could cause them to wear, secondary or bypass valves V2, V2', V5, V5' provided, according to the invention, in parallel with main valves VI, V3, V4, V6. These secondary valves have a markedly smaller cross section than the main valves, and a considerably higher pressure resistance. Therefore the stress on the main valves can be markedly reduced by suitable control of the secondary valves, and thus their service life can be proportionally increased.

Also provided is a pressure reservoir P that is connected to the concentrated saltwater output of membrane module 3 and is therefore subjected to the same pressure as the concentrated saltwater itself, for instance, roughly 70 bar. The pressure fluctuations that unavoidably occur with valve actuations as a result of volume losses are thereby to be compensated for, in order to produce as much as possible a constant operating pressure in membrane module 3.

Between the concentrated saltwater output of membrane module 3 and outlet chambers 101, 102 there are also provided several flow limiters R1, R2, R3, drawn as resistors, which are intended to prevent an abrupt pressure compensation by limiting the flow rate, therefore contributing to a gradual pressure compensation and thus to slow pressure changes in place of abrupt fluctuations. These flow limiters acting as "flow resistors" can be differently dimensioned.

The two flow limiters R2, R3 between node K2 and secondary valves V2, V2', and between node K3 and secondary valves V5, V5', respectively, can permit a greater amount of flow than flow limiter R1 between node K1 and pressure reservoir P, since flow limiters R2 and R3 are supposed to allow pressure compensation within an acceptable time at every actuation of the adjacent secondary valves V2, V2' and V5, V5', respectively. R1, on the other hand, is always connected to the concentrate outlet of membrane module 3, so that pressure compensation can take place uninterruptedly in pressure reservoir P. Flow limiter R1 can thus have a high flow resistance and allow only a slight flow. Decoupling of the concentrate circuit from membrane module 3 is correspondingly strong, so that the reactions of pressure fluctuations on membrane module 3 are negligibly small. In this context, it should also be mentioned that main valves V3 and V6 are always actuated only when a pressure compensation between node K1 and nodes K2, K3 has already been established by secondary valves V2 and V5. Main valves V3 and V6 are thus always actuated unpressurized, so that no pressure fluctuations result.

The maximum flow amount is limited in any case by the construction of secondary valves V2, V2', V5, V5', so that these secondary valves can automatically participate in the function of the flow limiters.

An operating cycle of a device according to the invention will be described below on the basis of the schematic diagrams shown in FIGS. 2 and 3 as well as the process diagram shown in FIG. 4. The numerical values entered in the diagram shown in FIG. 4 indicate the pressure drop across the respective valve at the time of actuation.

The starting situation is the situation shown in FIG. 2. Pistons 301, 302 in the two piston/cylinder devices have just reached the leftmost position. This is also indicated in the process diagram of FIG. 4 (see the two columns on the right). Main valves V3 and V4 are still opened. Since the pressure drop across these valves is 0, both valves close unpressurized (time t1). By this point at the latest, secondary valves V2 and V5' must also close, so as to separate nodes K2 and K3 from the concentrate outflow and the concentrate outlet of membrane module 3, respectively. At this point, all valves are closed.

To prepare for the opposite motion of pistons 301, 302, secondary valve V2' is now opened (time t2) to reduce the pressure of ca. 70 bar present at node K2 vis-à-vis the concentrate outflow. Since valve V2' is a secondary valve with a small cross section, the volume flow is small. A sudden pressure fluctuation is inhibited by flow limiter R2 or secondary valve V2' itself.

Simultaneously, main [sic; secondary] valve V5 is opened to apply pressure to node K3, which is unpressurized after the emptying of concentrated saltwater from outlet chamber 102. This application of pressure also takes place gradually since flow limiter R3 has limited the flow. The pressure that is also present at K1 therefore builds up at node K3.

Since node K1 is decoupled from main valve V5 by a flow limiter R1 with a high flow resistance, the compensation is effected from pressure accumulator P, which is in turn filled by way of node K1 via flow limiter R1. The pressure fluctuation at the concentrate outlet of membrane module 3 is thus determined in essence by the dimensioning of this flow limiter R1, so that a relatively constant pressure can be achieved at node K1.

As soon as the pressure at node K2 has been reduced by secondary valve V2' and the pressure at node K3 has been built up by secondary valve V5, main valves V1 and V6 can open unpressurized (time t3) and the opposite piston movement begins. This is indicated by arrows pointing to the right in FIG. 4.

At time t4, secondary valves V2' and V5 can again be closed. This closing of secondary valves V2' and V5 must take place at the latest by time t5, when pistons 301, 302 have reached their rightmost positions (see FIG. 3).

Because of the concentrated saltwater flowing into outlet chamber 102 due to the piston movement from the leftmost to the rightmost position, the saltwater has been pressed out of inlet chamber 202 into membrane module 3 with a pressure of ca. 80 bar (70 bar from the inflowing concentrate and 10 bar from a drive unit). At the same time, the concentrated saltwater has been transported without pressure from outlet chamber 101 to the concentrate drain and saltwater has flowed into inlet chamber 201. Thus all valves are again closed at time t5, and the same process takes place in the opposite direction by appropriate controlling.

It should be noted at this point that pump 1 is not provided mainly for introducing saltwater 10 into inlet chambers 201, 202, but is intended instead to prevent the occurrence of so-called cavitation, that is, areas of negative pressure in the stream of saltwater 10 flowing into inlet chambers 201, 202. Because of their turbulent flow, such areas are not stable. Ambient water is drawn into these areas by this negative pressure and penetrates them. Thereby it can reach such high speeds that it can easily knock particles out of the line walls and fittings, which can cause damage relatively soon that will require regularly recurring replacement of such parts. In the two-chamber system of the invention, pump 10 [sic; 1] thus does not have a high operating pressure, as in known devices, but operates, as it were, like a turbo charger in internal combustion engines, with a low pressure that suffices to prevent cavitation from appearing when saltwater is drawn in.

Figure 3:
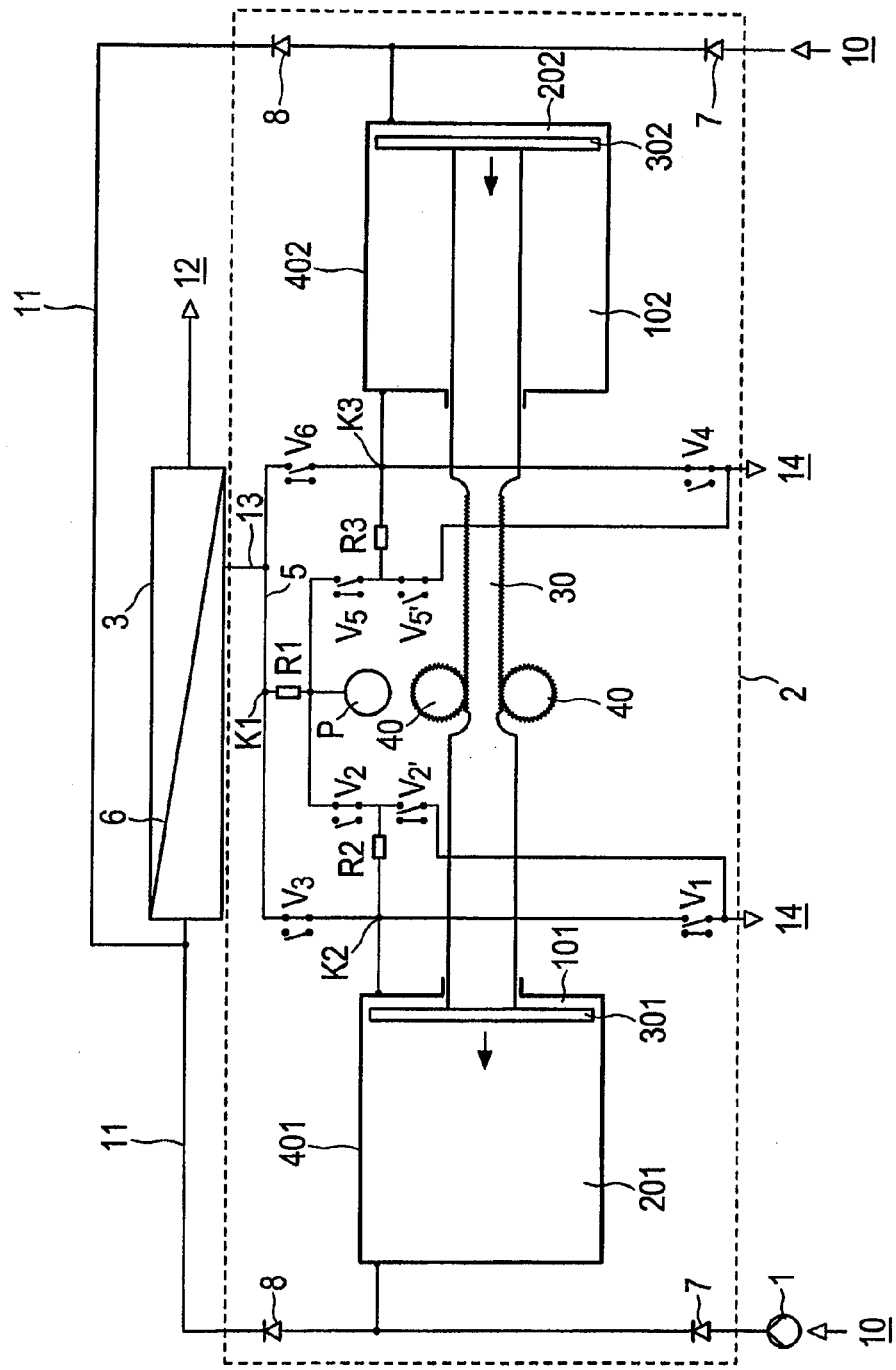
FIG. 3, an illustration of this embodiment in a second operational state.
Figure 4:
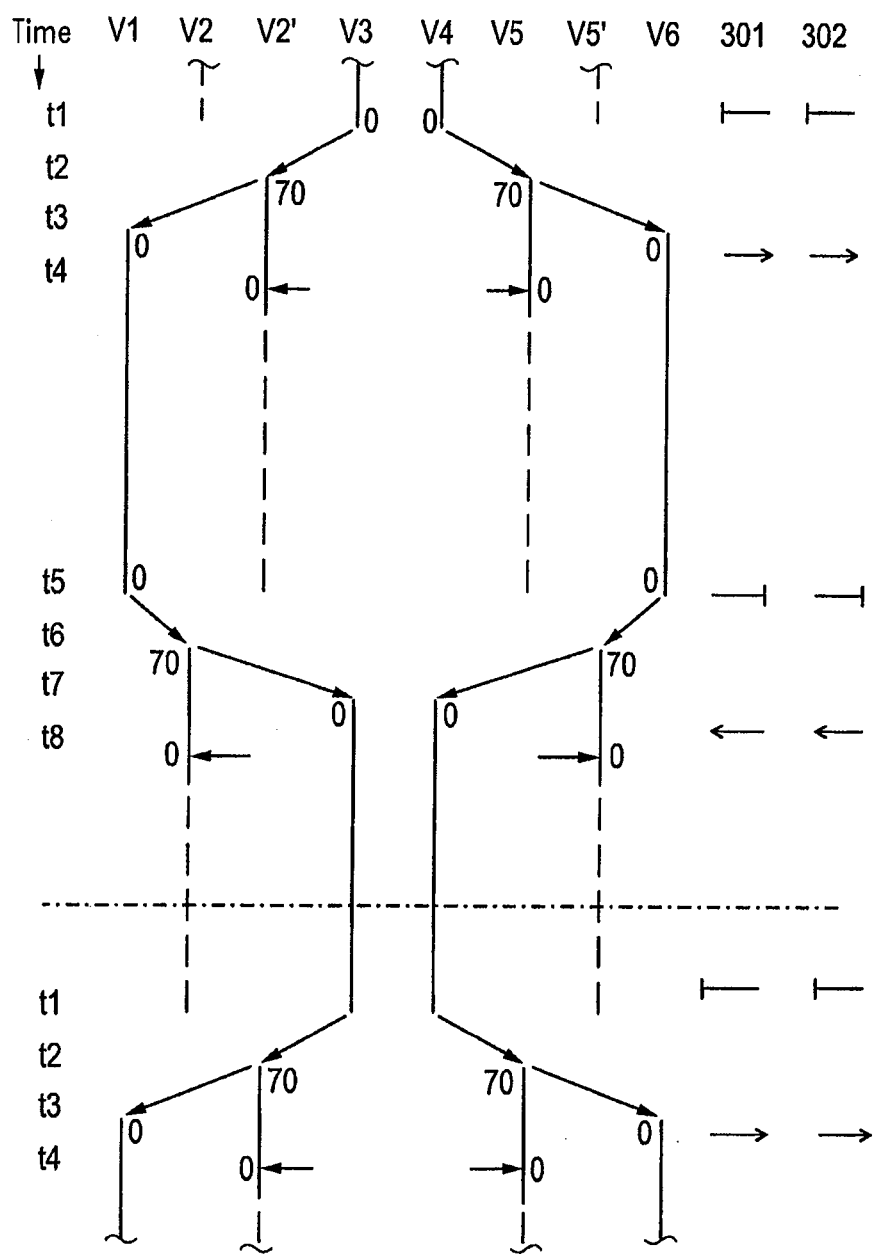
FIG. 4, an illustration of the operational states of this embodiment during a complete operating cycle.

The starting situation is that shown in FIG. 3. Pistons 301, 302 in the two cylinders have just reached the rightmost position. This is also indicated in the process diagram shown in FIG. 4. Valves V1 and V6 are still opened. Since the pressure drop across the valves is 0, both valves close unpressurized (time t5). By this point at the latest, secondary valves V2' and V5 must also close, so as to separate nodes K2 and K3 from the concentrate outflow and the concentrate outlet of membrane module 3, respectively. Now all valves are closed.

To prepare for the opposite motion of pistons 301, 302, secondary valve V5' is now opened (time t6) to reduce the pressure of ca. 70 bar present at node K3 vis-à-vis the concentrate outflow. Since valve V5' is a secondary valve with a small cross section, the volume flow is small. A sudden pressure fluctuation is inhibited by flow limiter R3.

Simultaneously, secondary valve V2 is opened to apply pressure to node K2, which is unpressurized after the emptying of concentrated saltwater from outlet chamber 101. This application of pressure also takes place gradually, since flow limiter R2 has limited the flow. The pressure that is also present at K1 therefore builds up at node K2. Since node K1 is decoupled from secondary valve V2 by a flow limiter R1 with a high flow resistance, the compensation is effected from pressure accumulator P, which is in turn filled via flow limiter R1.

As soon as the pressure at node K3 has been reduced by secondary valve V5' and the pressure at node K2 has been built up by secondary valve V2, main valves V3 and V4 can open unpressurized (time t7) and the opposite piston movement begins. This is indicated by arrows pointing to the left in FIG. 4.

At time t8, secondary valves V5 and V2 can again be closed. This closing of secondary valves V5 and V2 must take place at the latest by time t1, when pistons 301, 302 have reached their leftmost positions (see FIG. 2).

Because of the concentrated saltwater flowing into outlet chamber 101 due to the piston movement from the rightmost to the leftmost position, the saltwater has been pressed out of inlet chamber 201 into membrane module 3 with a pressure of ca. 80 bar. At the same time, the concentrated saltwater has been transported without pressure from outlet chamber 102 to the concentrate drain, and saltwater has flowed into inlet chamber 202.

Thus all valves are again closed at time t1 of the next cycle and the same process takes place in the opposite direction by appropriate controlling. The dot-dash line in FIG. 4 indicates at the same time the end of one cycle and the beginning of a new cycle.

From the pressures indicated for the individual valves it is understood that the main valves always switch unpressurized, while the secondary valves, which are suitably dimensioned, are subjected to a high pressure only when opening. This is a very decisive advantage of the present invention.

A seal between the piston and the respective cylinder of the piston/cylinder device is not strictly necessary, since a slight mixture of the two fluids does not significantly affect the action of the device. Sealing of the cylinder at the exit point of the connecting rod, on the other hand, is strictly necessary.

It can also be provided for the current position of the piston to be continuously detected. This position detection is necessary since a collision between piston and cylinder must be prevented to avoid damage. In this case, the piston position can be detected either directly or indirectly on, for instance, the connecting rod.

Since a pump to make up for the pressure loss is heavily stressed, on the one hand, by the high pressure and, on the other, by the aggressive saltwater medium and is in corresponding danger of failure, the present invention replaces such a pump in essence or completely by driving the connecting rod, whereby pressure losses are compensated for.

The pressure reservoir smoothes out the pressure fluctuations at the membrane module. An additional smoothing of pressure fluctuations results from multiple placement of a device according to the invention per membrane module, that is by placing at least two pressure compensation devices, each comprising a pair of piston/cylinder devices, per membrane module, particularly if they operate offset in phase from one another, so that at a given point in time t only the pistons of one pressure compensation device are in the extreme right or extreme left position. Depending on the design, one drive unit can be provided for all pressure compensation devices, or a separate one for each pressure compensation device.

The invention is not restricted to the illustrated embodiment; in particular, the pressure compensation device can also be designed differently. For instance, designs with several pairs of piston/cylinder devices and/or with piston/cylinder devices of different design are conceivable. The listed pressure values are also only example values to illustrate the invention, so that with a different piston geometry, for instance, other pressure conditions could also result.

With the device and method according to the invention, a very high efficiency in energy recovery is achieved, on the level of at least 90%. The feed pump need generate only a portion of the operating pressure of roughly 70–80 bar necessary for reverse osmosis; this portion is a function of the amount of water taken in and brings about an enormous reduction in costs and maintenance. In general, therefore, the production costs for a device for desalting water and preparing potable water are markedly reduced. The geometry of the pistons is not limited to a single possibility. The osmotic pressure can or should be adjusted depending on the salt content of the water. For brackish water—the lowest salt content—a lower pressure can be chosen.

The invention claimed is:

1. A method for desalting water by reverse osmosis, particularly for desalting seawater, in which saltwater is introduced under a first pressure into a pressure-compensation device comprising at least two piston/cylinder devices and conducted from the pressure-compensation device at a second pressure into a membrane module, the second pressure being higher than the first pressure, wherein desalted water and concentrated saltwater are conducted out of the membrane module, wherein the concentrated saltwater conducted out of the membrane module is continuously introduced at approximately the second pressure into the pressure-compensation device and used therein to approximately apply the second pressure to the saltwater introduced into the pressure-compensation device and to introduce the saltwater into the membrane module, and wherein the introduction of the concentrated saltwater into the pressure-compensation device and the conduction of the concentrated saltwater out of the pressure-compensation device are accomplished by means of controlled main valves, wherein secondary valves, arranged in parallel with the main valves, are controlled such that load peaks during opening and/or closing of the main valves are reduced, for which purpose the secondary valves are open at least during the opening or closing of the respective main valve arranged parallel thereto, and pressure fluctuations are compensated by means of a pressure reservoir arranged upstream of the pressure-compensation device via which the concentrated saltwater is introduced from the membrane module.

2. The method according to claim 1 wherein the concentrated saltwater from the membrane module is introduced into an outlet chamber of one of the at least two piston/cylinder devices of the pressure-compensation device at approximately the second pressure, and acts on the piston such that the saltwater introduced into an inlet chamber of the same piston/cylinder device is conducted at approximately the second pressure into the membrane module.

3. The method according to claim 2 wherein the concentrated saltwater is alternately introduced into the outlet chamber of one of the piston/cylinder devices, whereby the saltwater is simultaneously conducted out of the respective inlet chamber of the same piston/cylinder device to the membrane module, and the saltwater is simultaneously introduced into the inlet chamber of another piston/cylinder device at the first pressure, whereby the concentrated saltwater is conducted out of the outlet chamber of the same piston/cylinder device at a low pressure.

4. The method according to claim 3 wherein the piston/cylinder devices of the pressure-compensation device are controlled such that, simultaneously, the saltwater is introduced into the inlet chamber of the at least one piston/cylinder device, the concentrated saltwater is conducted out of the outlet chamber of the same piston/cylinder device, the concentrated saltwater is introduced into the outlet chamber of at least one other piston/cylinder device, and the saltwater is fed to the membrane module from the inlet chamber of the same piston/cylinder device.

5. The method according to claim 2 wherein a position of the pistons is continuously determined.

6. The method according to claim 1 wherein the pressure-compensation device comprises the at least two piston/cylinder devices operating in opposite phase and pistons of the piston/cylinder device are connected by a connecting rod.

7. The method according to claim 6, wherein the connecting rod is driven by means of a drive unit.

8. The method according to claim 1, wherein a cross section of the secondary valves is smaller than a cross section of the main valves.

9. The method according to claim 1 wherein a maximum flow through the secondary valves is controlled by means of flow limiters in the feed lines to the secondary valves.

10. The method according to claim 1 wherein the secondary valves are open only during the opening or closing process of the respective main valve arranged in parallel thereto.

11. The method according to claim 1 wherein control of the main and secondary valves is done such that the main valves switch unpressurized.

12. The method according to claim 1 wherein the pressure-compensation device comprises several pairs of the at least two piston/cylinder devices, each connected by a connecting rod, and in that the pairs are operated offset in phase.

13. A device for carrying out the method according to claim 1, with a supply pump for introducing saltwater into a pressure-compensation device and with a membrane module for separating the saltwater introduced from the pressure-compensation device into desalted water and concentrated saltwater, wherein a connecting line continuously under pressure during operation is provided between the membrane module and the pressure-compensation device for, respectively, feeding the concentrated saltwater from the membrane module to the pressure-compensation device and for feeding the saltwater from the pressure-compensation device to the membrane module, and wherein controlled main valves are provided for introducing the concentrated saltwater into the pressure-compensation device and for conducting the concentrated saltwater out of the pressure-compensation device, wherein secondary valves in parallel with the main valves are arranged for reducing load peaks during opening and/or closing of the main valves, for which purpose the secondary valves are open at least during the opening or closing of the respective main valve arranged parallel thereto, and pressure fluctuations are compensated by means of a pressure reservoir arranged upstream of the pressure-compensation device via which the concentrated saltwater is introduced from the membrane module.

* * * * *